United States Patent [19]

Osato et al.

[11] Patent Number: 5,652,738
[45] Date of Patent: Jul. 29, 1997

[54] MAGNETOOPTICAL RECORDING METHOD FOR OVERWRITING INFORMATION ON A RECORDING MEDIUM INCLUDES SELECTING ONE OF TWO RECORDING MODES BASED ON RECORDING INFORMATION

[75] Inventors: Yoichi Osato, Yokohama; Katsumi Miyata, Tokyo, both of Japan

[73] Assignee: Canon Kabushiki Kaisha, Tokyo, Japan

[21] Appl. No.: 610,845

[22] Filed: Mar. 5, 1996

Related U.S. Application Data

[63] Continuation of Ser. No. 191,605, Feb. 4, 1994, abandoned.

[30] Foreign Application Priority Data

Feb. 10, 1993 [JP] Japan .................................. 5-023023

[51] Int. Cl.$^6$ .................................................. G11B 7/00
[52] U.S. Cl. .................................................. 369/13
[58] Field of Search .................................. 369/13, 275.2, 369/275.3, 275.4, 32, 48, 54, 58; 360/114, 133, 59

[56] References Cited

U.S. PATENT DOCUMENTS

| | | | |
|---|---|---|---|
| 5,003,409 | 3/1991 | Ishiguro et al. | 360/59 |
| 5,132,945 | 7/1992 | Osato et al. | 369/13 |
| 5,163,031 | 11/1992 | Osato | 369/13 |
| 5,164,926 | 11/1992 | Matsumoto | 369/13 |
| 5,189,649 | 2/1993 | Birecki | 369/13 |
| 5,197,048 | 3/1993 | Yoshimoto et al. | 369/13 |
| 5,233,578 | 8/1993 | Yamamoto | 369/13 |
| 5,263,015 | 11/1993 | Niihara et al. | 369/116 |
| 5,265,073 | 11/1993 | Osato | 369/13 |
| 5,329,505 | 7/1994 | Ohtsuki | 369/13 |
| 5,353,265 | 10/1994 | Maeda et al. | 369/13 |
| 5,353,266 | 10/1994 | Fujii | 369/13 |
| 5,390,156 | 2/1995 | Izumi et al. | 369/13 |

FOREIGN PATENT DOCUMENTS

| | | |
|---|---|---|
| 0258978 | 3/1988 | European Pat. Off. . |
| 0315415 | 5/1989 | European Pat. Off. . |
| 0462843 | 12/1991 | European Pat. Off. . |
| 0496556 | 7/1992 | European Pat. Off. . |
| 3-127347 | 5/1991 | Japan . |

Primary Examiner—Nabil Hindi
Attorney, Agent, or Firm—Fitzpatrick, Cella, Harper & Scinto

[57] ABSTRACT

A magnetooptical recording method for overwriting information on a magnetooptical recording medium, which has a first magnetic layer and a second magnetic layer having a larger coercive force and a lower Curie temperature than those of the first magnetic layer, comprises an initialization step of initializing magnetization of the first magnetic layer in one direction, a first recording step of radiating a light beam by repeating radiation and non-radiation states of the laser beam, while applying a bias magnetic field after the initialization step, a second recording step of continuously radiating a light beam while applying a bias magnetic field in a direction opposite to the one direction after the initialization step, and a step of selecting one of the first and second recording steps in accordance with recording information.

2 Claims, 6 Drawing Sheets

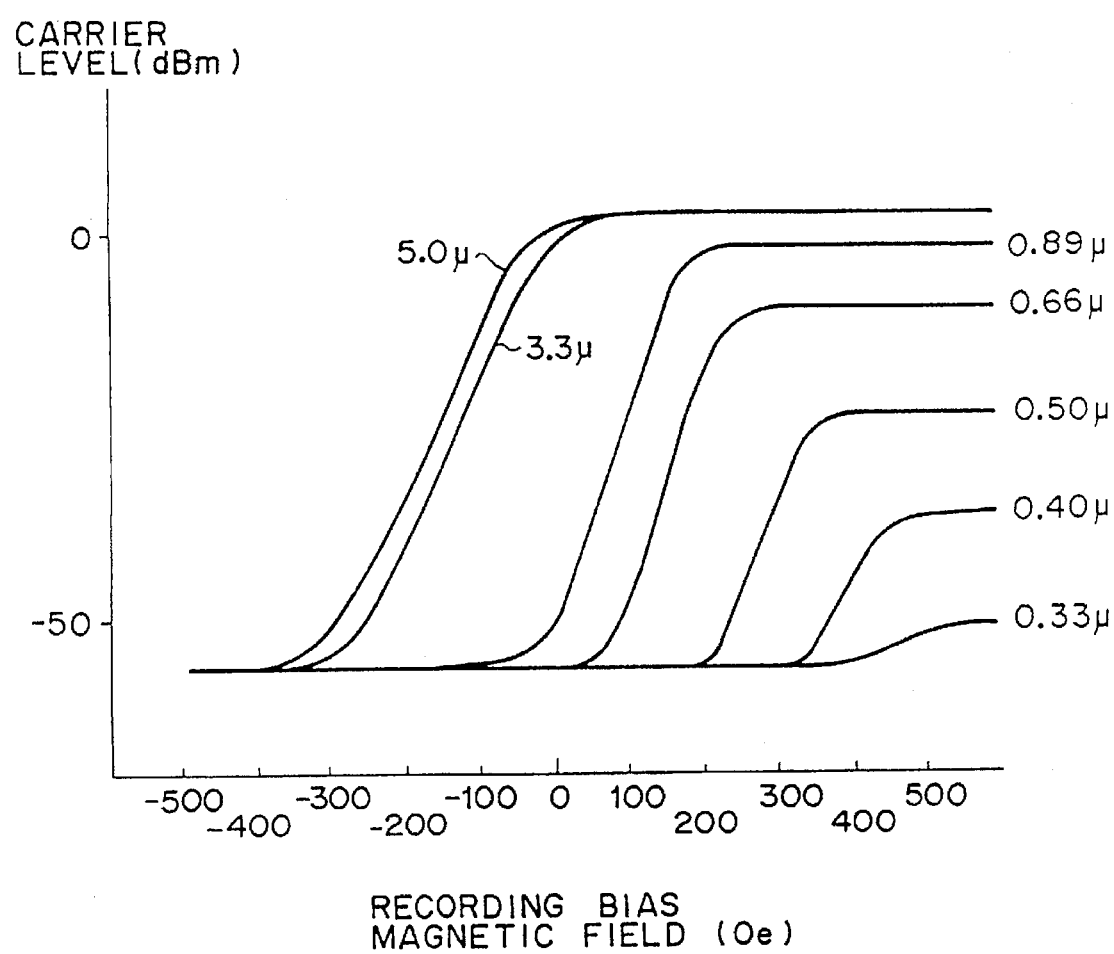

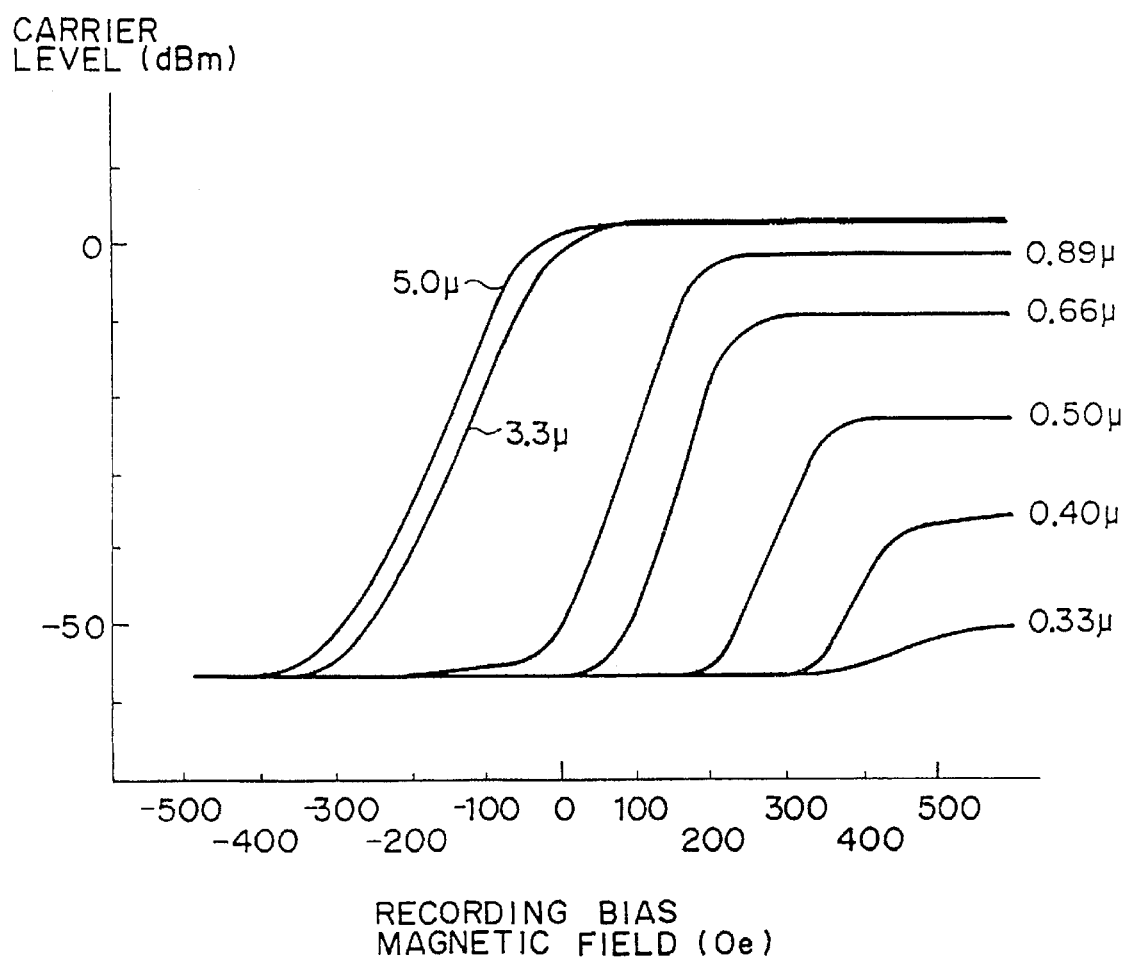

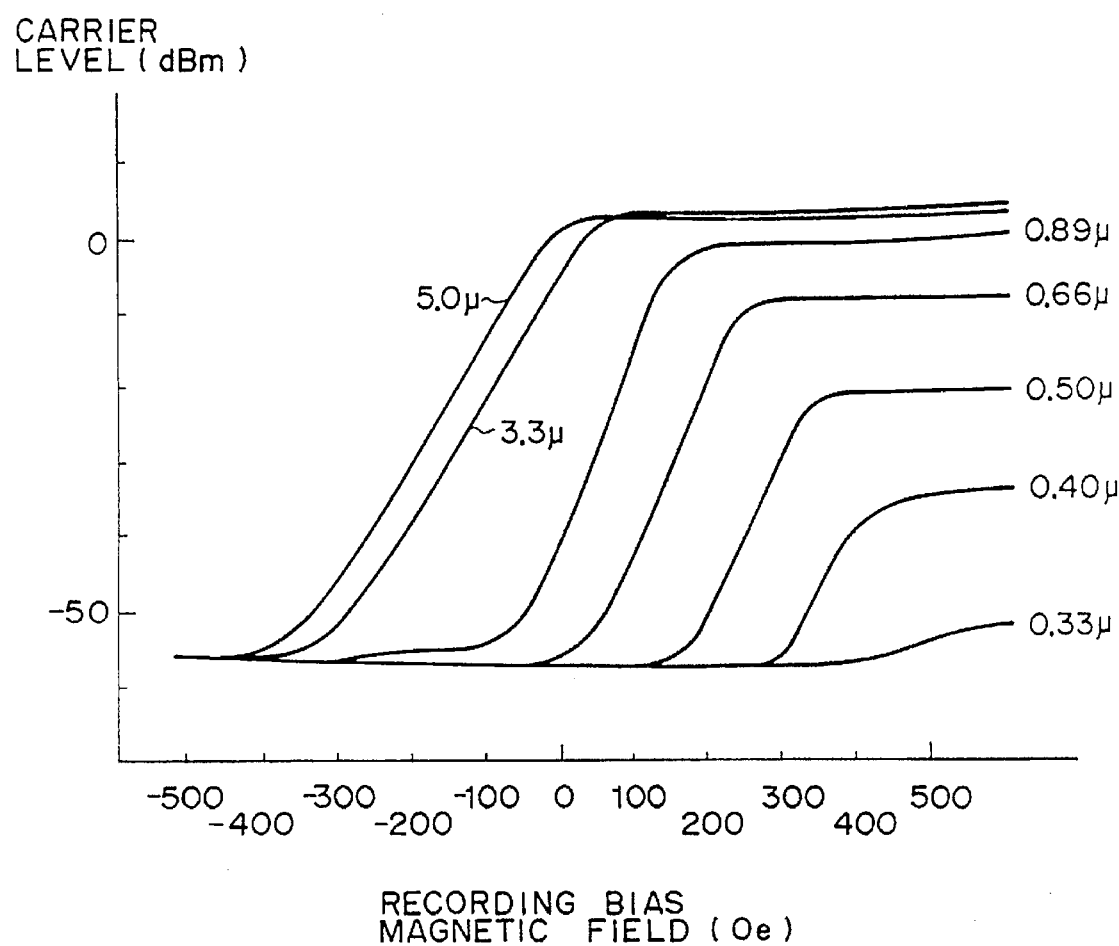

MAGNETOOPTICAL RECORDING METHOD FOR OVERWRITING INFORMATION ON A RECORDING MEDIUM INCLUDES SELECTING ONE OF TWO RECORDING MODES BASED ON RECORDING INFORMATION

This application is a continuation of application Ser. No. 08/191,605, filed Feb. 4, 1994, now abandoned.

BACKGROUND OF THE INVENTION

1. Filed of the Invention

The present invention relates to an overwrite capable magnetooptical recording method.

2. Related Background Art

Conventionally, a magnetooptical memory is known as an erasable optical memory. The magnetooptical memory has merits such as high-density recording, non-contact recording/reproduction, and the like as compared to a magnetic recording medium using a magnetic head. However, in order to record information on such a magnetooptical memory, in general, an already recorded portion must be erased (magnetized in one direction) before recording.

Thus, a method of independently arranging a recording/ reproduction head and an erasing head, a method of performing recording while modulating a magnetic field which is applied simultaneously with radiation of a continuous laser beam, and the like have been proposed. In the former recording method, the apparatus becomes large in scale, resulting in high cost. In the latter recording method, high-speed modulation is disturbed when a large magnetic field is applied. When a magnetic head is arranged near a medium surface to achieve high-speed modulation, the rotating medium and the magnetic head contact each other to cause a head crash, or the magnetic head is easily influenced by dust attached to the medium surface. As a result, the original merits of magnetooptical recording may be lost.

In order to solve these problems, a method for realizing overwriting by the following two types of recording methods using a two-layered perpendicular magnetic film which comprises a magnetic layer having a large coercive force and a low Curie temperature, and a magnetic layer having a small coercive force and a high Curie temperature has been proposed. In one recording method, after the direction of magnetization of only the layer having the small coercive force is aligned in one direction by applying a relatively large magnetic field, recording is performed by inverting the direction of magnetization of the aligned layer by applying large laser power. In the other recording method, recording is performed by aligning the direction of magnetization of the layer having the large coercive force and the low Curie temperature to the direction of magnetization of the layer having the small coercive force by applying small laser power without inverting the direction of magnetization of the layer having the small coercive force and the high Curie temperature. However, in this method, a recording state wherein a magnetic wall is present between the two magnetic layers may pose a problem associated with the stability of a recorded bit. Also, a magnetic field generating unit for aligning the direction of magnetization of the layer having the small coercive force becomes large in scale.

In addition, a method of reversing the direction of magnetization of a portion irradiated with a laser beam by a surrounding reversing magnetic field, as disclosed in, e.g., Japanese Laid-Open Patent Application No. 3-127347, has also been proposed. However, a method of performing recording by controlling the balance between the magnitudes of a recording bias magnetic field and a reversing magnetic field generates many noise components, and it is difficult to put this method into practical applications.

SUMMARY OF THE INVENTION

It is an object of the present invention to provide a magnetooptical recording method which can eliminate the drawbacks of the conventional light-intensity modulation recording methods, and can satisfactorily achieve overwrite recording.

In order to achieve the above object, there is provided a magnetooptical recording method for overwriting information on a magnetooptical recording medium, which has a first magnetic layer and a second magnetic layer having a larger coercive force and a lower Curie temperature than those of the first magnetic layer, comprising:

an initialization step of initializing magnetization of the first magnetic layer in one direction;

a first type recording step of radiating a light beam by repeating radiation and non-radiation states of the laser beam, while applying a bias magnetic field after the initialization step;

a second type recording step of continuously radiating a light beam while applying a bias magnetic field in a direction opposite to the one direction after the initialization step; and a step of selecting one of the first and second type recording steps in accordance with recording information.

BRIEF DESCRIPTION OF THE DRAWINGS

FIG. 5 is a graph showing the relationship between the magnitude of the recording bias magnetic field and the carrier level of a recording/reproduction signal in Test Example 1;

FIG. 6 is a graph showing the relationship between the magnitude of the recording bias magnetic field and the carrier level of a recording/reproduction signal in Test Example 11; and FIG. 7 is a graph showing the relationship between the magnitude of the recording bias magnetic field and the carrier level of a recording/reproduction signal in Test Example 21.

DETAILED DESCRIPTION OF THE PREFERRED EMBODIMENTS

The present invention will be described in detail hereinafter with reference to the accompanying drawings.

The first embodiment of a magnetooptical recording method according to the present invention will be described below with reference to FIGS. 1(a) through 1(f). In the following description, a case will be examined wherein a recorded bit is stable (a magnetic interface wall is not present) when the directions of magnetization of first and second magnetic layers are parallel to each other. The same applies to a case wherein a recorded bit is stable when the directions of magnetization of first and second magnetic layers are anti-parallel to each other.

Figure 1:
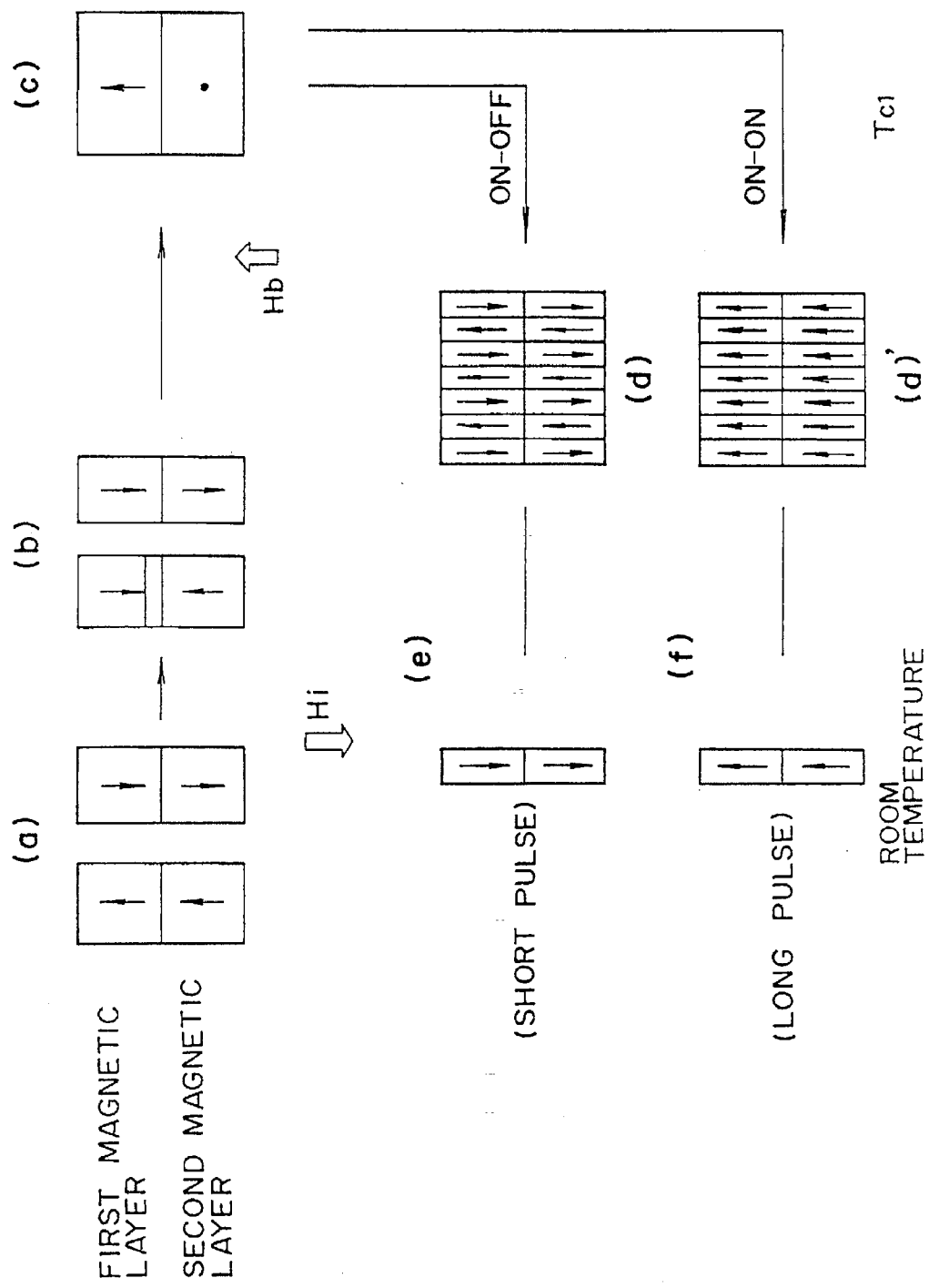
FIGS. 1(a), (b), (c), (d), (d)', (e) and (f) are views for explaining recording processes upon execution of overwrite recording by a magnetooptical recording method according to the first embodiment of the present invention.

A state in FIG. 1(a) corresponds to a state before recording. Before recording, the direction of magnetization of the first magnetic layer is aligned downward by a magnetizing magnetic field Hi (downward magnetic field). In this case, since the second magnetic layer has a sufficiently large coercive force, its direction of magnetization is left unchanged (state in FIG. 1(b)).

Then, one of a first type recording mode for radiating a laser beam with power capable of increasing the temperature of the first magnetic layer to a temperature near the Curie temperature by repetitively turning on/off (radiating/non-radiating) the laser beam at a frequency higher than the recording frequency (it corresponds to the recording mark length) while applying a recording bias magnetic field (upward magnetic field) Hb, and a second type recording mode for continuously radiating a laser beam with the same power as that in the first type recording mode while applying the bias magnetic field Hb is selected in accordance with recording information, and information is recorded.

In either laser radiation state, a temperature rise begins upon radiation of the laser beam, thus attaining a state in FIG. 1(c) near a Curie temperature Tc2 of the first magnetic layer. In the second magnetic layer, the temperature has exceeded its Curie temperature Tc1, and magnetization has disappeared. The direction of magnetization of the laser radiated portion of the first magnetic layer aligns in the direction of the recording bias magnetic field Hb.

As the laser radiated portion is separated from the current laser radiation position, the temperature of this portion begins to decrease to a temperature below the Curie temperature of the second magnetic layer, and one of states in FIGS. 1(d) and (d') appears. In this state, magnetization appears in the second magnetic layer to align the direction of sublattice magnetization with that of the first magnetic layer (not to form an interface magnetic wall).

While the temperature is further decreased to room temperature, the recording process is divided into two processes. This is associated with the laser ON pulse time upon radiation of the laser beam. More specifically, in a recorded bit formed by a short laser ON pulse time, each of reversed magnetic domains formed in the first magnetic layer has a small length and width. In this case, both the bias magnetic field and magnetic wall energy act to cause the reversed magnetic domains to disappear, and only the coercive force energy acts to leave the magnetic domain. Thus, narrow reversed magnetic domains most of which form a magnetic wall disappear, and a state in FIG. 1(e) is attained.

Conversely, in a recorded bit with a long on pulse time, the formation ratio of a magnetic wall decreases, and reversed magnetic domains are preserved, thus attaining a state in FIG. 1(f).

The state in FIGS. 1(e) or (f) corresponds to the final recorded state. When a portion in this final recorded state passes through the magnetizing magnetic field Hi, the state in FIG. 1(b) is attained again. In this state, since the direction of magnetization of the first magnetic layer is undesirably aligned in the magnetizing direction in a reproduction mode, the first magnetic layer does not contribute to a reproduction signal, and when a laser beam is incident from the first magnetic layer side, the first magnetic layer undesirably shields a magnetooptical reproduction signal from the second magnetic layer.

Thus, in the reproduction mode, the magnetizing magnetic field Hi may be removed, and a magnetic field capable of canceling a magnetic wall may be applied in the recording bias direction, so that the state in FIG. 1(a) is attained again to reproduce a recorded signal.

As can be understood from the above description, overwrite recording can be realized irrespective of the previous recorded state by radiating a laser beam continuously or by turning on/off the laser beam at a frequency higher than the recording frequency in accordance with recording information while applying the bias magnetic field Hb in a predetermined direction.

The second embodiment of the magnetooptical recording method will be described below with reference to FIGS. 2(a) through 2(e). As in the case of FIGS. 1(a) through (f), in the following description, a case will be examined wherein a recorded bit is stable (a magnetic interface wall is not present) when the directions of magnetization of first and second magnetic layers are parallel to each other. The same applies to a case wherein a recorded bit is stable when the directions of magnetization of first and second magnetic layers are anti-parallel to each other.

Figure 2:
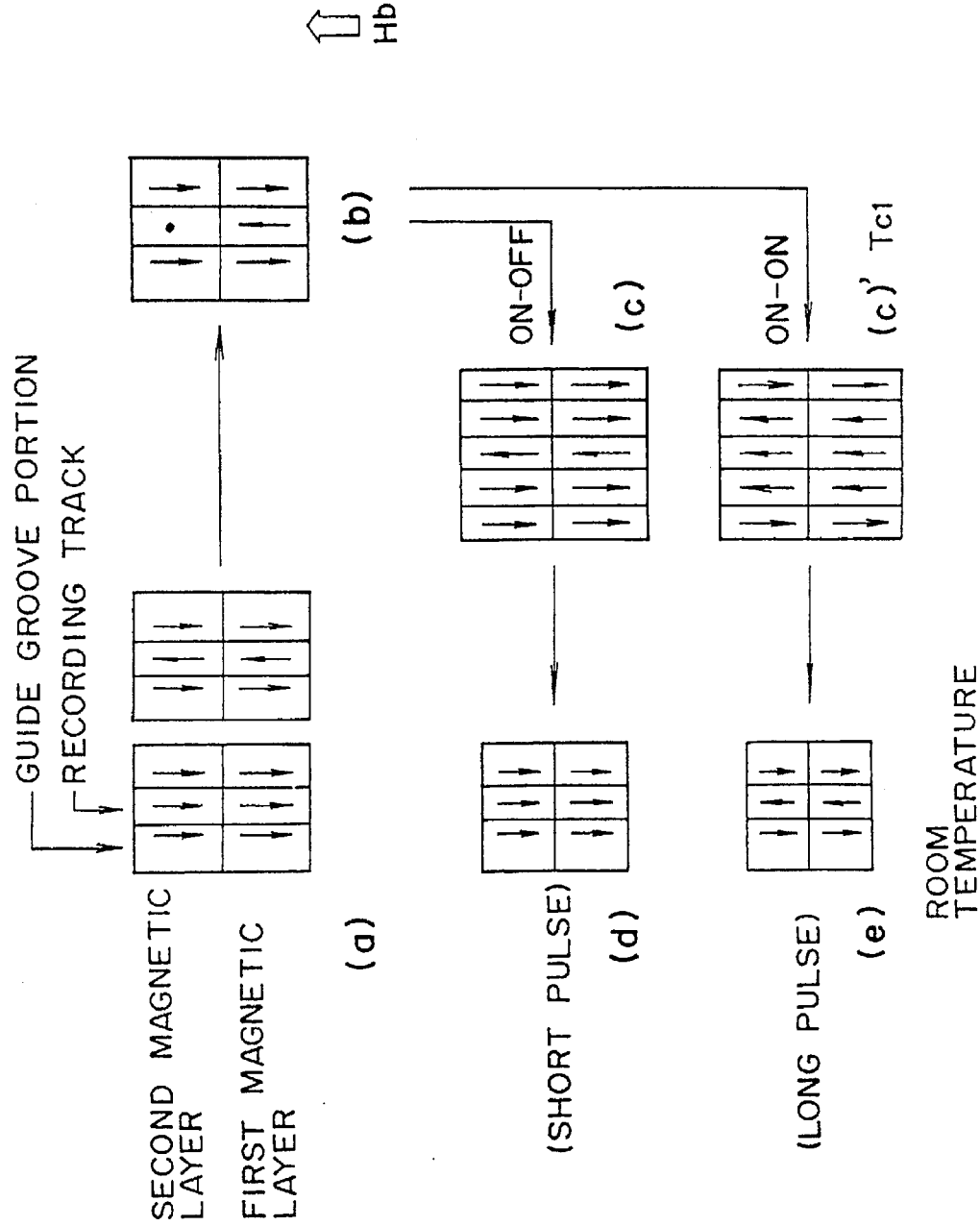
FIGS. 2(a), (b), (c), (c)', (d) and (e) are views for explaining recording processes upon execution of overwrite recording by a magnetooptical recording method according to the second embodiment of the present invention.

A state in FIG. 2(a) corresponds to a state before recording. The magnetization of a recording layer in a guide groove portion adjacent to a recording track is magnetized in a predetermined direction (the downward direction) before recording. In order to achieve this operation, erasing can be performed by applying a downward recording bias magnetic field, and focusing a laser beam onto the guide groove portion.

First and second type recording modes which are the same as those in the first embodiment are selectively performed in accordance with recording information.

In either laser radiation state, a temperature rise begins upon radiation of the laser beam, and a state in FIG. 2(b) near a Curie temperature Tc1 of the first magnetic layer is attained. In the second magnetic layer, the temperature has exceeded its Curie temperature Tc2, and magnetization has disappeared. The direction of magnetization of the laser radiated portion of the first magnetic layer aligns in the direction of the recording bias magnetic field Hb.

As the laser radiated portion is separated from the current laser radiation position, the temperature of this portion begins to decrease to a temperature below the Curie temperature of the second magnetic layer, and one of states in FIGS. 2(c) and (c') appears. In this state, magnetization appears in the second magnetic layer to align the direction of sublattice magnetization with that of the first magnetic layer (not to form an interface magnetic wall).

While the temperature is further decreased to room temperature, the recording process is divided into two processes. This is associated with the laser ON pulse time upon radiation of the laser beam. More specifically, in a recorded bit formed by a short laser ON pulse time, as the magnetization of a recording layer in a guide groove portion adjacent to a recording track is magnetized in the downward direction, each of reversed magnetic domains formed in the first magnetic layer has a small width. In this case, magnetic wall energy acts to cause the reversed magnetic domains to disappear, and the coercive force energy and the bias magnetic field acts to leave the magnetic domain. Thus, narrow reversed magnetic domains most of which form a magnetic wall disappear, and a state in FIG. 2(d) is attained.

Conversely, in a recorded bit with a long on pulse time, the formation ratio of a magnetic wall decreases, and reversed magnetic domains are preserved, thus attaining a state in FIG. 2(e).

As can be understood from the above description, overwrite recording can be realized irrespective of the previous recorded state by radiating a laser beam continuously or by turning on/off the laser beam at a frequency higher than the recording frequency in accordance with recording information while applying the bias magnetic field Hb in a predetermined direction.

Furthermore, the third embodiment of the magnetooptical recording method will be described below with reference to FIGS. 3(a) through 3(f). In the third embodiment, the recording bias magnetic field can be commonly used as the magnetizing magnetic field in the first embodiment.

As in the cases shown in FIGS. 1(a) through 1(f) and 2(a) through 2(e), in the following description, a case will be examined wherein a recorded bit is stable (a magnetic interface wall is not present) when the directions of magnetization of first and second magnetic layers are parallel to each other. The same applies to a case wherein a recorded bit is stable when the directions of magnetization of first and second magnetic layers are anti-parallel to each other.

Figure 3:
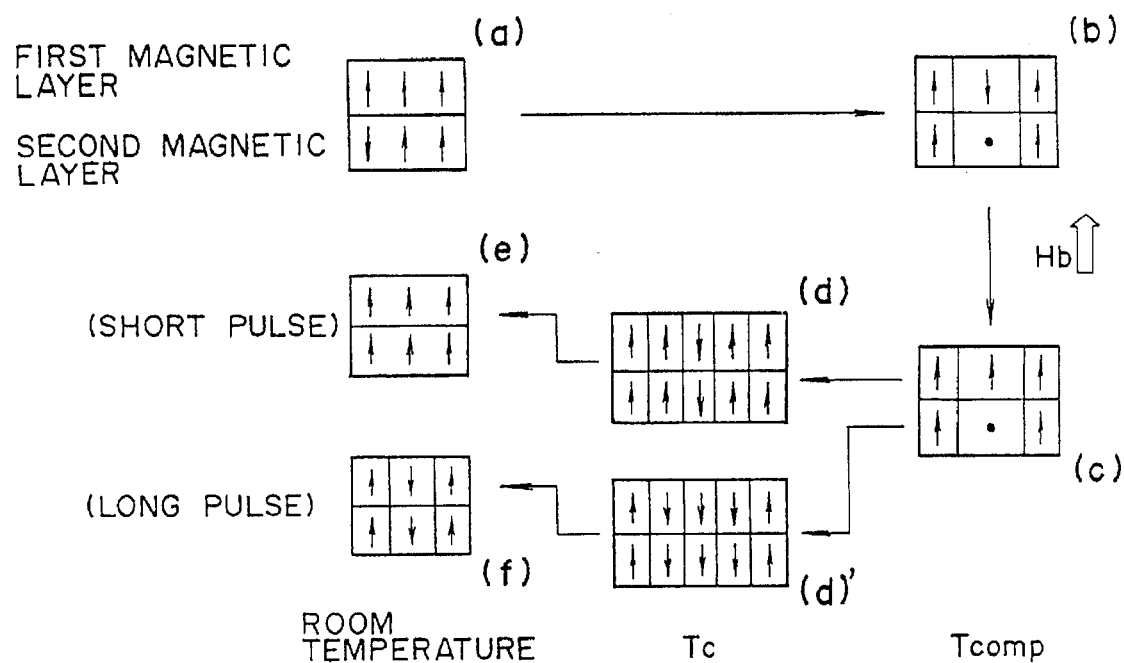
FIGS. 3(a), (b), (c), (d), (d)', (e) and (f) are views for explaining recording processes upon execution of overwrite recording by a magnetooptical recording method according to the third embodiment of the present invention.

A state in FIG. 3(a) corresponds to a state before recording. The direction of magnetization of the first magnetic layer is aligned in the direction (upward direction) of the recording bias magnetic field Hb by the recording bias magnetic field Hb. In this case, since the second magnetic layer has a sufficiently large coercive force, its direction of magnetization is left unchanged. As in the first embodiment, first and second type recording modes are selectively executed in accordance with recording information.

In either laser radiation state, the temperature begins to rise upon radiation of the laser beam, and exceeds a compensation temperature Tcomp of the first magnetic layer, thus attaining a state in FIG. 3(b). In the second magnetic layer, the temperature has exceeded its Curie temperature Tc, and magnetization has disappeared. In the first magnetic layer, sublattice magnetization becomes transition-metal atom dominant, and the direction of spontaneous magnetization is reversed.

In this state, the direction of magnetization of the laser radiated portion of the first magnetic layer is reversed again to the upward direction by the bias magnetic field Hb (state in FIG. 3(c)).

As the laser radiated portion is separated from the current laser radiation position, the temperature of this portion begins to decrease to a temperature below the Curie temperature of the second magnetic layer, and one of states in FIGS. 3(d) and (d') appears. In this state, magnetization appears in the second magnetic layer to align the direction of sublattice magnetization with that of the first magnetic layer (not to form an interface magnetic wall). Also, in the first magnetic layer, since the temperature is decreased below its compensation temperature Tcomp, the direction of spontaneous magnetization is reversed again to the downward direction.

While the temperature is further decreased to room temperature, the recording process is divided into two processes. This is associated with the laser ON pulse time upon radiation of the laser beam. More specifically, in a recorded bit formed by a short laser ON pulse time, each of reversed magnetic domains formed in the first magnetic layer has a small length and width. In this case, both the bias magnetic field and magnetic Wall energy act to cause the reversed magnetic domains to disappear, and only the coercive force energy acts to leave the magnetic domain. Thus, narrow reversed magnetic domains most of which form a magnetic wall disappear, and a state in FIG. 3(e) is attained.

Conversely, in a recorded bit with a long on pulse time, the formation ratio of a magnetic wall decreases, and reversed magnetic domains are preserved, thus attaining a state in FIG. 3(f).

As can be understood from the above description, overwrite recording can be realized irrespective of the previous recorded state by radiating a laser beam continuously or by turning on/off the laser beam at a frequency higher than the recording frequency in accordance with recording information while applying the bias magnetic field Hb in a predetermined direction.

Figure 4:
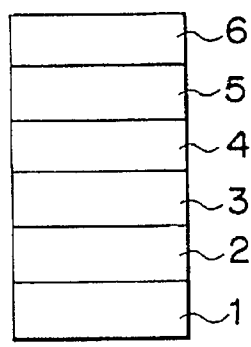
FIG. 4 is a schematic sectional view showing a structure of a magnetooptical recording medium used in the recording method of the present invention.

A recording medium used in the recording method of the present invention has a structure, as shown in, e.g., FIG. 4. A protective layer 2 is formed on a transparent substrate 1, and first and second magnetic layers 3 and 4 are stacked on the protective layer 2. Thereafter, a protective layer 5 and a metal reflection layer 6 are formed. The formation order of the first and second magnetic layers 3 and 4 may be reversed. Substrates as shown in FIG. 4 may be adhered to each other via an adhesive, so that the substrates 1 face outwardly, thus forming a double-sided recording medium.

Note that the first magnetic layer has a small coercive force and a high Curie temperature, and the second magnetic layer has a large coercive force and a low Curie temperature relative to those of the first magnetic layer.

The first magnetic layer is designed, so that small magnetic domains disappear. For this purpose, it is required that magnetic wall energy owl of the first magnetic layer be sufficiently large near the Curie temperature Tc of the second magnetic layer at which a recorded bit shape is determined, i.e., the Curie temperature of the first magnetic layer be high. In order to transfer a bit shape in the second magnetic layer whose coercive force becomes large at room temperature to the first magnetic layer, the coercive force of the first magnetic layer must be small at room temperature, i.e., the magnetic anisotropy of the first magnetic layer must be small.

From these conditions, it is preferable that the Curie temperature of the first magnetic layer be 200° C. or more, and its coercive force be 3 kOe or less.

It is preferable that the Curie temperature of the second magnetic layer fall within a range from 70° C. to 230° C., and its coercive force be 3 kOe or more.

As the materials of the two magnetic layers, materials having perpendicular magnetic anisotropy, and a relatively large magnetooptical effect can be utilized.

As the material of the first magnetic layer, amorphous alloys of rare-earth elements and transition-metal elements, which have relatively small perpendicular magnetic anisotropy, such as Gd-Fe, Gd-Fe-Co, Gd-Co, Gd-Ho-Co, Gd-Ho-Fe, Gd-Ho-Fe-Co, Gd-Dy-Fe, Tb-Dy-Fe-Co, Gd-Dy-Co, and the like, are preferable.

In order to allow a formed interface magnetic wall to exist stably, a Pt/Co multi-layered film, which has large saturation magnetization and a small coercive force, but is a good perpendicular magnetic film, may be used.

As the material of the second magnetic layer, amorphous alloys of rare-earth elements and transition-metal elements, which have relatively large perpendicular magnetic anisotropy, such as Tb-Fe, Tb-Dy-Fe, Dy-Fe, Tb-Fe-Co, Dy-Dy-Fe-Co, Dy-Fe-Co, and the like are preferable.

In addition to these materials, intermetallic components such as MnBi, PtCo, and the like may be used. Also, oxide crystals such as garnet, ferrite, and the like may be used.

As the material of the protective layer, a material which allows a laser beam used in reproduction/recording to transmit therethrough is preferable, and SiO, $SiO_2$, ZnS, ZnSe, $Al_2O_3$, AlN, $Si_3N_4$, TiN, Si, SiC, and the like are used.

As the material of the metal reflection layer, Al, Cu, Au, Ti, Fe, Co, Pt, and the like; alloys containing these elements as major components; and the like are used.

In the magnetooptical recording medium used in the third embodiment, the first magnetic layer has a compensation temperature Tcomp between room temperature and its Curie temperature. The Curie temperature Tc of the second magnetic layer is preferably lower than the compensation temperature Tcomp of the first magnetic layer. Note that the compensation temperature Tcomp preferably falls within a range from 100° C. to 250° C.

Each of the first to third embodiments can realize satisfactory overwrite recording by using a magnetooptical recording medium in which the Curie temperature, saturation magnetization, and film thickness of the first magnetic layer are properly set, so that no recorded bit is formed in the recording mode for repetitively turning on/off a laser beam, and a recorded bit is formed in the recording mode for continuously turning on a laser beam, and by adjusting the frequency of a laser to be modulated, and the direction and magnitude of the recording bias magnetic field to be applied.

An intermediate layer consisting of a magnetic or non-magnetic material may be formed between the first and second magnetic layers to adjust the transfer characteristics of magnetization (characteristics for aligning the directions of sublattice magnetization in the same direction).

The present invention will be described in more detail hereinafter by way of its test examples.

TEST EXAMPLE 1

A polycarbonate disk pre-formed with pregrooves and preformat signals was set in a sputtering apparatus to be separated from a target by 10 cm, and was rotated. A 600-Å thick $Si_3N_4$ layer was formed as a protective layer on the substrate using a first target in an argon atmosphere at a sputtering rate of 100 Å/min and a sputtering pressure of $5\times10^{-1}$ Pa. In the argon atmosphere, a $Gd_{22}Fe_{68}Co_{10}$ (at %) alloy (sublattice magnetization was FeCo atom dominant) was sputtered using a second target at a sputtering rate of 100 Å/min and a sputtering pressure of $6\times10^{-1}$ Pa, thereby forming a 250-Å thick first magnetic layer having a Curie temperature of about 270° C. and a coercive force of 1,200 Oe.

In the argon atmosphere, a $Tb_{24}Fe_{68}Co_8$ (at %) alloy (sublattice magnetization was Tb atom dominant) was sputtered using a third target, thereby forming a 200-Å thick second magnetic layer having a Curie temperature of about 160° C. and a coercive force of 15 kOe.

Furthermore, in the argon atmosphere, $Si_3N_4$ as the first target and Al as a fourth target were sputtered in turn at a sputtering pressure of $5\times10^{-1}$ Pa, thereby forming a 400-Å thick $Si_3N_4$ protective layer and a 400-Å thick Al metal layer.

The substrate which had completed the above-mentioned film formation was adhered to an adhesion polycarbonate substrate using a hot-melt adhesive, thus manufacturing a magnetooptical disk sample.

The first and second magnetic layers are coupled to each other by an exchange interaction. Since the first magnetic layer was strongly coupled to the second magnetic layer, a magnetic field required for reversing the direction of magnetization of the first magnetic layer from a stabilized state without an interface magnetic wall was about 2 kOe.

This magnetooptical disk was set in a recording/reproduction apparatus (OMS-2000 available from NAKAMICHI CORP.), and conventional erasing and recording tests were conducted.

Before recording, an external magnetic field of 2.5 kOe was applied to a recording track portion to magnetize the first magnetic layer. Thereafter, erasing was performed (a recording layer was magnetized in one direction) by continuously radiating a laser beam (a spot size of about 1.2μ, a wavelength=780 nm, and an output=10 mW) while applying a recording bias magnetic field of 200 Oe in a direction opposite to that of the erasing magnetic field, and rotating the disk at a linear velocity of 9 m/sec.

Similarly, before recording, the first magnetic layer was magnetized by an external magnetic field of 2.5 kOe. Thereafter, the relationship between the magnitude of the recording bias magnetic field and the carrier level of a recording/reproduction signal was examined while changing the frequency at which the laser beam (output=8 mW) was turned on/off at a time ratio of 50%. Note that a continuous beam of 1 mW was radiated to reproduce a signal. FIG. 5 shows the results.

In FIG. 5, the minus sign of the bias magnetic field indicates the erasing direction.

As can be seen from FIG. 5, as the recording frequency increases (as the length of a recorded bit decreases), a bias magnetic field at which the carrier level begins to rise (a recorded bit is formed) is shifted in the plus direction.

In the erasing state (the recording layer is magnetized in one direction), a demagnetizing field of about 500 Oe is present. For example, in long bits having lengths of 5.0μ and 3.3μ, the formation ratio of a magnetic wall in each recorded bit is small, and portions whose temperature is raised by the laser beam are directly formed as recorded bits.

When the frequency increases, and the formation ratio of a magnetic wall in each recorded bit increases, a recorded bit receives, from magnetic wall energy, a force for causing the recorded bit to disappear. Thus, no recorded bit is formed unless the recording bias field is applied in the plus (write) direction to assist the formation of the recorded bit.

Finally, when the bit length becomes as small as about 0.33μ, a recorded bit can no longer be formed even when a recording bias magnetic field of about 400 Oe is applied.

Recording was performed by radiating a laser beam as ON/ON continuous beams (a frequency of 1 MHz; corresponding to a recorded bit length 3.3μ) for 20 patterns in accordance with signals for forming recorded bits while turning on/off the laser beam at 20 MHz (a recorded bit length of 0.17μ) at a time ratio of 50%. The recording bias magnetic field was 200 Oe, and recording power was 8 mW. As a result, a satisfactory recording/reproduction signal having a signal frequency of 1 MHz and a C/N ratio of 52 dB was obtained. Also, overwriting recording tests of signal frequency of 2 MHz including a process for initializing the first magnetic layer were conducted on a region which had been subjected to recording in FIG. 5 (recorded bits were already present) under the same conditions as described above. As a result, no previously recorded signal was reproduced, and a satisfactory reproduction signal having a reproduction signal frequency of 2 MHz was obtained.

COMPARATIVE TEST EXAMPLE 1

A sample disk having substantially the same structure as that of Test Example 1, except that no second magnetic layer was formed, was prepared following the same procedures as in Test Example 1. Recording tests were conducted under the same conditions as in Test Example 1. As a result, it was difficult due to large recording noise to confirm, in both recording after erasing and overwrite recording, the magnitude of the bias magnetic field at which the carrier level began to rise, or whether a signal before overwriting was sufficiently erased.

This is because the first magnetic layer is designed so that short recorded bits can be easily erased after recording. Thus, it was confirmed that the second magnetic layer for stabilizing formed recorded bits was necessary.

TEST EXAMPLES 2–4

Sample disks (Test Examples 2 to 4) which had the same structures as in Test Example 1, and different film thicknesses of the first magnetic layer were prepared, and overwriting tests were conducted under the same conditions as in Test Example 1. Table 1 to be presented later summarizes the test results.

As can be understood from Table 1, when the film thickness of the first magnetic layer becomes as small as 75 Å (Test Example 2), the effect of causing short bits to disappear is weakened, and it becomes difficult to erase a previously recorded bit by overwriting although this effect may vary depending on the material and film thickness of the second magnetic layer.

Also, when the film thickness of the first magnetic layer becomes as large as 400 Å (Test Example 4), recording noise considerably increases since the effect of causing recorded bits to disappear may become too strong, and the bit shape may become unstable.

TEST EXAMPLES 5 AND 6

Sample disks (Test Examples 5 and 6) which had the same structures as in Test Example 1, and different material compositions of the first magnetic layer were prepared, and overwriting tests were conducted under the same conditions as in Test Example 1. Table 1 below summarizes the test results.

As can be understood from Table 1, when the Curie temperature of the first magnetic layer is lowered to a temperature near the Curie temperature of the second magnetic layer, magnetization appears in the second magnetic layer simultaneously with the start of formation of a recorded bit in the first magnetic layer, and the effect of causing short bits to disappear cannot be obtained, resulting in an increase in recording noise (Test Example 6), although this phenomenon varies depending on the material and film thickness of the second magnetic layer.

TEST EXAMPLES 7–9

Sample disks (Test Examples 7 to 9) which had the same structures as in Test Example 1, and different film formation conditions using a Pt/Co multi-layered film as the material of the first magnetic layer were prepared, and overwriting tests were conducted under the same conditions as in Test Example 1. As a result of these tests, satisfactory recording operations could be performed.

The first magnetic layer was formed under the following conditions. Films each having a film thickness of about 2 to 50 Å were repetitively stacked by opening/closing a shutter plate while sputtering Pt from the fifth target, Pd from the sixth target, and Co from the seventh target at a sputtering rate of 20 to 100 Å/min and a sputtering pressure of $9 \times 10^{-1}$ Pa in an argon atmosphere, thus forming the first magnetic layer. The first magnetic layers of the sample disks of Test Examples 7 to 9 respectively have the following structures:

Test Example 7: 10 cycles of multi-layered films each comprising a 20-Å thick Pt layer and a 4-Å thick Co layer Test Example 8: 15 cycles of multi-layered films each comprising a 15-Å thick Pd layer and a 6-Å thick Co layer Test Example 9: 15 cycles of multi-layered films each comprising a 10-Å thick Pt layer and a 4-Å thick Co layer In each of these test examples, the first magnetic layer can be magnetized by a small magnetic field due to a decrease in coercive force and an increase in saturation magnetization of the first magnetic layer. In Test Example 9, a satisfactory recording operation could be performed in a combination of a magnetizing magnetic field of 350 Oe and a recording bias magnetic field of 150 Oe.

TABLE 1

| Sample | Material of First Magnetic Layer | (°C.) $Tc_1$ | (Å) h | (Oe) Hc | (emu/cc) Ms | Remarks |
|---|---|---|---|---|---|---|
| Test Example 1 | $Gd_{22}Fe_{68}Co_{10}$ | 270 | 250 | 1,200 | 270 | Good |
| Test Example 2 | $Gd_{22}Fe_{68}Co_{10}$ | 270 | 75 | 1,100 | 265 | Previously recorded carrier remains |
| Test Example 3 | $Gd_{22}Fe_{68}Co_{10}$ | 270 | 150 | 1,200 | 270 | Good |
| Test Example 4 | $Gd_{22}Fe_{68}Co_{10}$ | 270 | 400 | 1,250 | 270 | Recording noise large |
| Test Example 5 | $Gd_{13}Ho_{10}Fe_{57}Co_{20}$ | 230 | 250 | 1,000 | 220 | Good |
| Test Example 6 | $Gd_{13}Ho_{10}Fe_{62}Co_{15}$ | 200 | 250 | 700 | 200 | Recording noise increases |
| Test Example 7 | $(Pt_{20}/Co_4) \times 10$ | 280 | 240 | 500 | 320 | Magnetic field necessary for magnetization = 700 Oe |
| Test Example 8 | $(Pd_{15}/Co_6) \times 15$ | 300 | 315 | 400 | 370 | Magnetic field necessary for magnetization = 600 Oe |
| Test Example 9 | $(Pt_{10}/Co_4) \times 15$ | 350 | 210 | 250 | 420 | Magnetic field necessary for magnetization = 350 Oe Recording magnetic field = 150 Oe |

(Notes) Common to Tables 1 and 2
$Tc_1$: Curie temperature of first magnetic layer
h: Film thickness of first magnetic layer
Hc: Coercive force of first magnetic layer
Ms: Saturation magnetization of first magnetic layer

TEST EXAMPLE 10

When a magnetic field of 2.5 kOe which could magnetize only the first magnetic layer was applied to a region on which satisfactory recording at a signal frequency of 1 MHz and a reproduction C/N ratio of 52 dB was performed in Test Example 1, the first magnetic layer did not contribute to a reproduction signal, and the reproduction C/N ratio decreased to 30 dB.

Then, when a magnetic field having a polarity opposite to that of the magnetizing magnetic field was applied up to 1.8 kOe, the formed interface magnetic wall disappeared, an initial magnetization state was attained, and the reproduction C/N ratio also increased to 52 dB.

TEST EXAMPLE 11

The same magnetooptical disk sample as in Test Example 1 was prepared following the same procedures as in Test Example 1.

The first and second magnetic layers are coupled to each other by an exchange interaction as in Test Example 1. Since the first magnetic layer was strongly coupled to the second magnetic layer, a magnetic field required for reversing the direction of magnetization of the first magnetic layer from a stabilized state without an interface magnetic wall was about 2 kOe as in Test Example 1.

This magnetooptical disk was set in a recording/reproduction apparatus (OMS-2000 available from NAKAMICHI CORP.), and conventional erasing and recording tests were conducted as in Test Example 1. In this case, the substrate in which both the guide groove portion and the recording track portion had a width of about 0.7µ, and a track pitch of about 1.4µ was used.

Before recording, a continuous laser beam (a spot size of about 1.2µ, a wavelength=780 nm, and an output at the beam spot=10 mW) was radiated while applying an erasing bias magnetic field of 500 Oe to the guide groove portion, and rotating the disk at a linear velocity of 9 m/sec, thereby magnetizing the guide groove portion.

Similarly, the recording track portion was erased (magnetized).

Then, the relationship between the magnitude of the recording bias magnetic field and the carrier level of the recording/reproduction signal was examined while applying a recording bias field of 200 Oe in a direction opposite to that of the erasing magnetic field, and changing the frequency for turning on/off the laser beam (an output at the beam spot=8 mW) at a time ratio of 50%. Note that a continuous beam of 1 mW was radiated for signal reproduction. FIG. 6 shows the results.

In FIG. 6, the minus sign of the bias magnetic field indicates the erasing direction.

As can be seen from FIG. 6, as the recording frequency increases (as the length of a recorded bit decreases), a bias magnetic field at which the carrier level begins to rise (a recorded bit is formed) is shifted in the plus direction as in Test Example 1.

In the erasing state (the recording layer is magnetized in one direction), a demagnetizing field of about 500 Oe is present as in Test Example 1. For example, in long bits having lengths of 5.0µ and 3.3µ, the formation ratio of a magnetic wall in each recorded bit is small, and portions whose temperature is raised by the laser beam are directly formed as recorded bits.

When the frequency increases, and the formation ratio of a magnetic wall in each recorded bit increases, a recorded bit receives, from magnetic wall energy, a force for causing the recorded bit to disappear as in Test Example 1. Thus, no recorded bit is formed unless the recording bias field is applied in the plus (write) direction to assist the formation of the recorded bit.

Finally, when the bit length becomes as small as about 0.33µ, a recorded bit can no longer be formed even when a recording bias magnetic field of about 400 Oe is applied.

Recording was performed by radiating a laser beam as ON/ON continuous beams (a frequency of 1 MHz; corresponding to a recorded bit length 3.3µ) for 20 patterns in accordance with signals for forming recorded bits while turning on/off the laser beam at 20 MHz (a recorded bit length of 0.17µ) at a time ratio of 50%. The recording bias magnetic field was 200 Oe, and recording power was 8 mW. As a result, a satisfactory recording/reproduction signal having a signal frequency of 1 MHz and a C/N ratio of 52 dB was obtained. Also, overwriting recording tests of signal frequency of 2 MHz including a process for initializing the first magnetic layer were conducted on a region which had been subjected to recording in FIG. 6 (recorded bits were already present) under the same conditions as described above. As a result, no previously recorded signal was reproduced, and a satisfactory reproduction signal having a reproduction signal frequency of 2 MHz was obtained.

COMPARATIVE TEST EXAMPLE 2

A sample disk having substantially the same structure as that of Test Example 11, except that no second magnetic layer was formed, was prepared following the same procedures as in Test Example 11. Recording tests were conducted under the same conditions as in Test Example 11. As a result, it was difficult due to large recording noise to confirm, in both recording after erasing and overwrite recording, the magnitude of the bias magnetic field at which the carrier level began to rise, or whether a signal before overwriting was sufficiently erased.

This is because the first magnetic layer is designed so that short recorded bits can be easily erased after recording. Thus, it was confirmed that the second magnetic layer for stabilizing formed recorded bits was necessary.

COMPARATIVE TEST EXAMPLE 3

A recording test was conducted following substantially the same procedures as in Test Example 11, except that the direction of a magnetic field for erasing the guide groove portion of the sample disk in Test Example 11 was reversed, i.e., the direction was set to be the same as the direction of the recording bias magnetic field. As a result, it was difficult due to large recording noise to confirm, in both recording after erasing and overwrite recording, the magnitude of the bias magnetic field or whether a signal before overwriting was sufficiently erased. In Test Example 11, after a short bit string is written by ON/OFF-recording of a laser beam, the short bit string is erased by magnetic wall energy. However, in this comparative test example, since the magnetization of the neighboring guide groove portion has the same direction as that of the recorded bit string, the short bit string extends in the guide groove portion and is stabilized. Therefore, small magnetic domains, which should not be formed originally, remain.

As can be understood from the results of this comparative test example, the recording track neighboring portion must be magnetized in advance in the erasing direction.

TEST EXAMPLES 12-14

Sample disks (Test Examples 12 to 14) which had the same structures as in Test Example 11, and different film thicknesses of the first magnetic layer were prepared, and overwriting tests were conducted under the same conditions as in Test Example 11. Table 2 to be shown later summarizes the test results.

As can be understood from Table 2, when the film thickness of the first magnetic layer becomes as small as 75 Å (Test Example 12), the effect of causing short bits to disappear is weakened, and it becomes difficult to erase a previously recorded bit by overwriting although this effect may vary depending on the material and film thickness of the second magnetic layer.

Also, when the film thickness of the first magnetic layer becomes as large as 400 Å (Test Example 14), recording noise considerably increases since the effect of causing recorded bits to disappear may become too strong, and the bit shape may become unstable.

TEST EXAMPLES 15 AND 16

Sample disks (Test Examples 15 and 16) which had the same structures as in Test Example 11, and different material compositions of the first magnetic layer were prepared, and overwriting tests were conducted under the same conditions as in Test Example 11. Table 2 below summarizes the test results.

As can be understood from Table 2, when the Curie temperature of the first magnetic layer is lowered to a temperature near the Curie temperature of the second magnetic layer, magnetization appears in the second magnetic layer simultaneously with the start of formation of a recorded bit in the first magnetic layer, and the effect of causing short bits to disappear cannot be obtained, resulting in an increase in recording noise (Test Example 16), although this phenomenon varies depending on the material and film thickness of the second magnetic layer.

TEST EXAMPLES 17–19

Sample disks (Test Examples 17 to 19) which had the same structures as in Test Example 11, and different film formation conditions using a Pt/Co multi-layered film as the material of the first magnetic layer were prepared, and overwriting tests were conducted under the same conditions as in Test Example 11. As a result of these tests, satisfactory recording operations could be performed.

The first magnetic layer was formed under the following conditions. Films each having a film thickness of about 2 to 50 Å were repetitively stacked by opening/closing a shutter plate while sputtering Pt from the fifth target, Pd from the sixth target, and Co from the seventh target at a sputtering rate of 20 to 100 Å/min and a sputtering pressure of $9 \times 10^{-1}$ Pa in an argon atmosphere, thus forming the first magnetic layer. The first magnetic layers of the sample disks of Test Examples 17 to 19 respectively have the following structures:

Test Example 17: 10 cycles of multi-layered films each comprising a 20-Å thick Pt layer and a 4-Å thick Co layer Test Example 18: 15 cycles of multi-layered films each comprising a 15-Å thick Pd layer and a 6-Å thick Co layer Test Example 19: 15 cycles of multi-layered films each comprising a 10-Å thick Pt layer and a 4-Å thick Co layer In each of these test examples, the first magnetic layer can be magnetized by a small magnetic field due to a decrease in coercive force and an increase in saturation magnetization of the first magnetic layer.

TABLE 2

| Sample | Material of First Magnetic Layer | (°C.) $Tc_1$ | (Å) h | (Oe) Hc | (emu/cc) Ms | Remarks |
|---|---|---|---|---|---|---|
| Test Example 11 | $Gd_{22}Fe_{68}Co_{10}$ | 270 | 250 | 1,200 | 270 | Good |
| Test Example 12 | $Gd_{22}Fe_{68}Co_{10}$ | 270 | 75 | 1,100 | 265 | Previously recorded carrier remains |
| Test Example 13 | $Gd_{22}Fe_{68}Co_{10}$ | 270 | 150 | 1,200 | 270 | Good |
| Test Example 14 | $Gd_{22}Fe_{68}Co_{10}$ | 270 | 400 | 1,250 | 270 | Recording noise large |
| Test Example 15 | $Gd_{33}Ho_{10}Fe_{57}Co_{20}$ | 230 | 250 | 1,000 | 220 | Good |
| Test Example 16 | $Gd_{13}Ho_{10}Fe_{62}Co_{15}$ | 200 | 250 | 700 | 200 | Recording noise increases |
| Test Example 17 | $(Pt_{20}/Co_4) \times 10$ | 280 | 240 | 500 | 320 | Good, recording magnetic field = 200 Oe |
| Test Example 18 | $(Pt_{15}/Co_6) \times 14$ | 300 | 315 | 400 | 370 | Good, recording magnetic field = 200 Oe |
| Test Example 19 | $(Pt_{10}/Co_4) \times 15$ | 350 | 210 | 250 | 420 | Good, recording magnetic field = 150 Oe |

TEST EXAMPLE 20

A sample disk which was formed with the same recording film as in Test Example 11 was prepared using a substrate whose recording track width was changed, and the relationship between the recording track width and the recording characteristics was examined. After a signal having a frequency of 1 MHz (a recorded bit length 3.3μ) was recorded under the same conditions as in Test Example 11, a signal having a frequency of 2 MHz (a recorded bit length=1.65μ) was overwritten thereon. As shown in Table 3 below, in a disk having a smaller track recording width, the level of an unerased signal having a frequency of 1 MHz is smaller, and as can be understood from Table 3, the recording method of the present invention is suitable for high-density recording with a small track pitch.

TABLE 3

| Recording Track Width | Carrier Level (dBm) of 1-MHz Unerased Signal | C/N Ratio of 1-MHz Unerased Signal |
|---|---|---|
| 1.25μ | −20 | 35 |
| 1.0μ | −25 | 30 |
| 0.8μ | −27 | 28 |
| 0.7μ | −30 | 25 |
| 0.6μ | −33 | 22 |
| 0.5μ | −37 | 20 |

TEST EXAMPLE 21

A polycarbonate disk pre-formed with pregrooves and preformat signals was set in a sputtering apparatus to be separated from a target by 10 cm, and was rotated. A 600-Å thick $Si_3N_4$ layer was formed as a protective layer on the substrate using a first target in an argon atmosphere at a sputtering rate of 100 Å/min and a sputtering pressure of $5\times10^{-1}$ Pa. In the argon atmosphere, a $Gd_{25}Fe_{65}Co_{10}$ (at %) alloy (sublattice magnetization was Gd atom dominant) was sputtered using a second target at a sputtering rate of 100 Å/min and a sputtering pressure of $6\times10^{-1}$ Pa, thereby forming a 250-Å thick first magnetic layer having a Curie temperature of about 250° C., a compensation temperature of about 200° C., and a coercive force of 1,200 Oe.

In the argon atmosphere, a $Tb_{24}Fe_{68}Co_8$ (at %) alloy (sublattice magnetization was Tb atom dominant) was sputtered using a third target, thereby forming a 200-Å thick second magnetic layer having a Curie temperature of about 160° C. and a coercive force of 15 kOe.

Furthermore, in the argon atmosphere, $Si_3N_4$ as the first target and Al as a fourth target were sputtered in turn at a sputtering pressure of $5\times10^{-1}$ Pa, thereby forming a 400-Å thick $Si_3N_4$ protective layer and a 400-Å thick Al metal layer.

The substrate which had completed the above-mentioned film formation was adhered to an adhesion polycarbonate substrate using a hot-melt adhesive, thus manufacturing a magnetooptical disk sample.

The first and second magnetic layers are coupled to each other by an exchange interaction. Since the first magnetic layer was strongly coupled to the second magnetic layer, a magnetic field required for reversing the direction of magnetization of the first magnetic layer from a stabilized state without an interface magnetic wall was about 2 kOe.

This magnetooptical disk was set in a recording/reproduction apparatus (OMS-2000 available from NAKAMICHI CORP.), and conventional erasing and recording tests were conducted. In this case, erasing was performed (the recording layer was magnetized in one direction) by radiating a continuous laser beam (a spot size of about 1.2µ, a wavelength=780 nm, and an output=10 mW) while applying an erasing bias magnetic field of 500 Oe in a direction opposite to that of the erasing magnetic field, and rotating the disk at a linear velocity of 9 m/sec.

Then, the relationship between the magnitude of the recording bias magnetic field and the carrier level of a recording/reproduction signal was examined while changing the frequency at which the laser beam (output=8 mW) was turned on/off at a time ratio of 50%. Note that a continuous beam of 1 mW was radiated to reproduce a signal. FIG. 7 shows the results.

In FIG. 7, the minus sign of the bias magnetic field indicates the erasing direction.

As can be seen from FIG. 7, as the recording frequency increases (as the length of a recorded bit decreases), a bias magnetic field at which the carrier level begins to rise (a recorded bit is formed) is shifted in the plus direction as in Test Example 1.

In the erasing state (the recording layer is magnetized in one direction), a demagnetizing field of about 500 Oe is present. For example, in long bits having lengths of 5.0µ and 3.3µ, the formation ratio of a magnetic wall in each recorded bit is small, and portions whose temperature is raised by the laser beam are directly formed as recorded bits.

When the frequency increases, and the formation ratio of a magnetic wall in each recorded bit increases, a recorded bit receives, from magnetic wall energy, a force for causing the recorded bit to disappear. Thus, no recorded bit is formed unless the recording bias field is applied in the plus (write) direction to assist the formation of the recorded bit.

Finally, when, the bit length becomes as small as about 0.33µ, a recorded bit can no longer be formed even when a recording bias magnetic field of about 400 Oe is applied.

Recording was performed by radiating a laser beam as ON/ON continuous beams (a frequency of 1 MHz; corresponding to a recorded bit length 3.3µ) for 20 patterns in accordance with signals for forming recorded bits while turning on/off the laser beam at 20 MHz (a recorded bit length of 0.17µ) at a time ratio of 50%. The recording bias magnetic field was 200 Oe, and recording power was 8 mW. As a result, a satisfactory recording/reproduction signal having a signal frequency of 1 MHz and a C/N ratio of 52 dB was obtained. Also, overwriting recording tests of signal frequency of 2 MHz were conducted on a region which had been subjected to recording in FIG. 5 (recorded bits were already present) under the same conditions as described above. As a result, no previously recorded signal was reproduced, and a satisfactory reproduction signal having a reproduction signal frequency of 2 MHz was obtained.

COMPARATIVE TEST EXAMPLE 4

A sample disk having substantially the same structure as that of Test Example 21, except that no second magnetic layer was formed, was prepared following the same procedures as in Test Example 21. Recording tests were conducted under the same conditions as in Test Example 21. As a result, it was difficult due to large recording noise to confirm, in both recording after erasing and overwrite recording, the magnitude of the bias magnetic field at which the carrier level began to rise, or whether a signal before overwriting was sufficiently erased.

This is because the first magnetic layer is designed so that short recorded bits can be easily erased after recording. Thus, it was confirmed that the second magnetic layer for stabilizing formed recorded bits was necessary.

TEST EXAMPLES 22–24

Sample disks (Test Examples 22 to 24) which had the same structures as in Test Example 21, and different film thicknesses of the first magnetic layer were prepared, and overwriting tests were conducted under the same conditions as in Test Example 21. Table 4 below summarizes the test results.

As can be understood from Table 4, when the film thickness of the first magnetic layer becomes as small as 75 Å (Test Example 22), the effect of causing short bits to disappear is weakened, and it becomes difficult to erase a previously recorded bit by overwriting although this effect may vary depending on the material and film thickness of the second magnetic layer.

Also, when the film thickness of the first magnetic layer becomes as large as 400 Å (Test Example 24), recording noise considerably increases since the effect of causing recorded bits to disappear may become too strong, and the bit shape may become unstable.

TEST EXAMPLES 25 AND 26

Sample disks (Test Examples 25 and 26) which had the same structures as in Test Example 21, and different material compositions of the first magnetic layer were prepared, and overwriting tests were conducted under the same conditions as in Test Example 21. Table 4 below summarizes the test results.

As can be understood from Table 4, when the Curie temperature of the first magnetic layer is lowered to a temperature near the Curie temperature of the second magnetic layer, magnetization appears in the second magnetic layer simultaneously with the start of formation of a recorded bit in the first magnetic layer, and the effect of causing short bits to disappear cannot be obtained, resulting in an increase in recording noise (Test Example 26), although this phenomenon varies depending on the material and film thickness of the second magnetic layer.

magnetic layer having a relatively large coercive force and a low Curie temperature. That is, recording is realized by radiating a laser beam capable of reversing the direction of magnetization of the first magnetic layer while repetitively turning on/off the laser beam or by radiating a continuous ON beam in accordance with recording information while applying a recording bias magnetic field in one direction.

TABLE 4

| Sample | Material of First Magnetic Layer | $Tc_1$ (°C.) | Tcomp (°C.) | h (Å) | Hc (Oe) | Ms (emu/cc) | Remarks |
|---|---|---|---|---|---|---|---|
| Test Example 21 | $Gd_{25}Fe_{65}Co_{10}$ | 250 | 200 | 250 | 1,200 | 250 | Overwriting good |
| Test Example 22 | $Gd_{25}Fe_{65}Co_{10}$ | 250 | 200 | 75 | 1,000 | 240 | Previously recorded carrier remains |
| Test Example 23 | $Gd_{25}Fe_{65}Co_{10}$ | 250 | 200 | 150 | 1,200 | 250 | Overwriting good |
| Test Example 24 | $Gd_{25}Fe_{65}Co_{10}$ | 250 | 200 | 400 | 1,200 | 250 | Recording noise large |
| Test Example 25 | $Gd_{17}Ho_{10}Fe_{53}Co_{20}$ | 220 | 190 | 250 | 1,000 | 230 | Overwriting good |
| Test Example 26 | $Gd_{12}Ho_{10}Fe_{63}Co_{15}$ | 190 | 160 | 250 | 850 | 200 | Recording noise increases |
| Comparative Test Example 4 | $Gd_{25}Fe_{65}Co_{10}$ | 250 | 200 | 250 | 1,200 | 250 | No second magnetic layer Recording noise large |

(Notes)
$Tc_1$: Curie temperature of first magnetic layer
Tcomp: Compensation temperature of first magnetic layer
h: Film thickness of first magnetic layer
Hc: Coercive force of first magnetic layer
Ms: Saturation magnetization of first magnetic layer As described above, according to the magnetooptical recording method of each of the first and second embodiments of the present invention, satisfactory overwrite recording can be realized by the following two different recording modes using a magnetooptical recording medium having a recording layer which comprises a first magnetic layer having a relatively small coercive force and a high Curie temperature, and a second magnetic layer having a relatively large coercive force and a high Curie temperature. That is, recording is realized by radiating a laser beam having power capable of reversing the direction of magnetization of the first magnetic layer while repetitively turning on/off the laser beam or by radiating a continuous ON beam, onto the first magnetic layer or a recording track portion in accordance with recording information, while applying a recording bias magnetic field in a direction opposite to a magnetization direction of the first magnetic layer after the first magnetic layer is magnetized in one direction before recording, or applying a recording bias magnetic field in a direction opposite to a magnetization direction of a guide groove portion after the guide groove portion is magnetized in one direction before recording.

According to the magnetooptical recording method of the third embodiment of the present invention, satisfactory overwrite recording can be realized by the following two different recording modes using a magnetooptical recording medium having a recording layer which comprises a first magnetic layer having a compensation temperature between room temperature and its Curie temperature, and a second A magnetooptical recording medium in which the Curie temperature, saturation magnetization, and film thickness of the first magnetic layer are properly set, so that no recorded bits are formed in the recording mode using the laser beam which is repetitively turned on/off, and recorded bits are formed in the recording mode using the continuous ON beam, is used, and the frequency of the laser beam to be modulated, and the direction and magnitude of a recording bias field to be applied are adjusted, thus realizing satisfactory overwrite recording free from noise.

When recorded bits formed by the above-mentioned recording method is reproduced and read out, the applied magnetic field for magnetizing the first magnetic layer is removed, and a magnetic field having a magnitude capable of eliminating an interface magnetic wall is applied in the same direction as that of the recording bias magnetic field, thereby obtaining a satisfactory reproduction signal free from noise.

What is claimed is:

1. A magnetooptical recording method for overwriting information on a magnetooptical recording medium, which has a first magnetic layer and a second magnetic layer having a larger coercive force and a lower Curie temperature than those of the first magnetic layer, said method comprising:

an initialization step of initializing magnetization of the first magnetic layer in one direction;

a first recording step of radiating a light beam to the recording medium to perform radiation and non-radiation of the light beam having a power sufficient to raise the temperature of the first magnetic layer to a temperature near the Curie temperature thereof at a frequency higher than a frequency of recording information, while applying a bias magnetic field in a direction opposite to the one direction, after said initialization step;

a second recording Step of continuously radiating a light beam having a power sufficient to raise the temperature of the first magnetic layer to a temperature near the Curie temperature thereof, while applying the bias magnetic field, after said initialization step; and a step of selecting one of the first and second recording steps in accordance with the recording information.

2. A method according to claim 1, wherein the first magnetic layer has a compensation temperature between room temperature and a Curie temperature thereof, and further comprising performing said initialization step using the bias magnetic field.

* * * * *

UNITED STATES PATENT AND TRADEMARK OFFICE
CERTIFICATE OF CORRECTION

PATENT NO. : 5,652,738                    Page 1 of 2
DATED      : July 29, 1997
INVENTOR(S): YOICHI OSATO, et al.

It is certified that error appears in the above-identified patent and that said Letters Patent is hereby corrected as shown below:

COLUMN 1:

Line 12, "Filed" should read --Field--.

COLUMN 3:

Line 15, "1(b)." should read --1(b)).--; and
    Line 56, "on" should read --ON--.

COLUMN 4:

Line 49, "states" should read --the states--; and
    Line 65, "acts" should read --act--.

COLUMN 5:

Line 1, "on" should read --ON--;
    Line 51, "states" should read --the states--; and
    Line 67, "Wall" should read --wall--.

UNITED STATES PATENT AND TRADEMARK OFFICE
CERTIFICATE OF CORRECTION

PATENT NO.   : 5,652,738
DATED        : July 29, 1997
INVENTOR(S)  : YOICHI OSATO, et al.

It is certified that error appears in the above-indentified patent and that said Letters Patent is hereby corrected as shown below:

COLUMN 6:

Line 5, "on" should read --ON--.

COLUMN 14, In "TABLE 2":

Line 15, "$Gd_{33}$" should read --$Gd_{13}$--;
Line 23, "x14" should read --x15--; and
Line 27, "x15" should read --x15--.

COLUMN 18:

Line 50, "is" should read --are--.

COLUMN 19:

Line 8, "Step" should read --step--.

Signed and Sealed this

Twenty-fourth Day of February, 1998

Attest:

BRUCE LEHMAN

*Attesting Officer*            *Commissioner of Patents and Trademarks*